United States Patent
Olesen

(10) Patent No.: US 9,143,842 B2
(45) Date of Patent: Sep. 22, 2015

(54) APPARATUS FOR TRANSFERRING DATA BETWEEN BODIES UNDERGOING ROTATION

(75) Inventor: Ib Olesen, Randers (DK)

(73) Assignee: Vestas Wind Systems A/S, Aarhus N. (DK)

( * ) Notice: Subject to any disclaimer, the term of this patent is extended or adjusted under 35 U.S.C. 154(b) by 969 days.

(21) Appl. No.: 13/319,043
(22) PCT Filed: May 7, 2010
(86) PCT No.: PCT/EP2010/002807
§ 371 (c)(1), (2), (4) Date: Jan. 12, 2012
(87) PCT Pub. No.: WO2010/127867
PCT Pub. Date: Nov. 11, 2010

(65) Prior Publication Data
US 2012/0106655 A1  May 3, 2012

Related U.S. Application Data

(60) Provisional application No. 61/176,240, filed on May 7, 2009.

(30) Foreign Application Priority Data

May 7, 2009  (GB) .................................. 0907892.4

(51) Int. Cl.
H04B 5/00 (2006.01)
H04L 27/00 (2006.01)
H04Q 9/00 (2006.01)
G01D 21/00 (2006.01)

(52) U.S. Cl.
CPC ................. *H04Q 9/00* (2013.01); *G01D 21/00* (2013.01); *H04Q 2209/40* (2013.01); *H04Q 2209/82* (2013.01); *H04Q 2209/84* (2013.01); *H04Q 2209/886* (2013.01); *Y02B 10/30* (2013.01)

(58) Field of Classification Search
CPC .......................... H04Q 2209/886; Y02B 10/30
USPC ........................................ 455/41.1; 375/256
See application file for complete search history.

(56) References Cited

U.S. PATENT DOCUMENTS

| 7,909,567 B2 * | 3/2011 | Fein et al. ........................ 415/60 |
| 8,167,555 B2 * | 5/2012 | Yoshida .......................... 416/32 |
| 8,608,441 B2 * | 12/2013 | Hotto .............................. 416/42 |

FOREIGN PATENT DOCUMENTS

| DE | 3331722 A1 | 3/1985 |
| DE | 19532043 A1 | 3/1997 |
| DE | 102004028595 A1 | 12/2005 |

(Continued)

OTHER PUBLICATIONS

International Search Report and Written Opinion for Application No. PCT/EP2010/002807 dated Feb. 3, 2011.

(Continued)

*Primary Examiner* — Eugene Yun
(74) *Attorney, Agent, or Firm* — Patterson & Sheridan, LLP

(57) ABSTRACT

An apparatus for transferring data between bodies undergoing rotation is provided. The bodies in question may be wind turbine components such as a turbine drive shaft and a stationary part of the turbine, such as nacelle gearbox. A data or control signal can therefore be transmitted between a rotating member, such as a turbine blade, and equipment in the nacelle. The apparatus comprises two members that are placed adjacent and opposing one another, and on the opposing surface of which a number of electrical paths are provided. The closed electrical paths do not enclose the rotational axis. At least one of the loops is energized with a carrier high frequency oscillating signal to create a flux that threads the loop on the opposing member. Modulation of the carrier frequency allows signals to be transmitted between the members.

20 Claims, 4 Drawing Sheets

(56) References Cited

FOREIGN PATENT DOCUMENTS

| | | |
|---|---|---|
| EP | 1086653 A1 | 3/2001 |
| FR | 2588334 A1 | 4/1987 |

OTHER PUBLICATIONS

United Kingdom Combined Search and Examination Report for Application No. GB0907892.4 dated Jul. 31, 2009.

* cited by examiner

APPARATUS FOR TRANSFERRING DATA BETWEEN BODIES UNDERGOING ROTATION

This invention relates to an apparatus for transferring data between two bodies undergoing rotation relative to one another, and in particular relates to such an apparatus for use in a wind turbine.

Wind turbines comprise a number of components that must rotate in order to perform their function. The most notable of such components are rotor blades and drive shaft (and optionally the gear chain) that extract the kinetic energy from the wind and turn it into movement of a generator for the production of electricity.

A wind turbine is shown schematically in FIG. 1 to which reference should now be made. FIG. 1 illustrates a wind turbine 1, comprising a wind turbine tower 2 on which a wind turbine nacelle 3 is mounted. A wind turbine rotor 4 comprising at least one wind turbine blade 5 is mounted on a hub 6. The hub 6 is connected to the nacelle 3 through a low speed shaft (not shown) extending from the nacelle front. The wind turbine illustrated in FIG. 1 may be a small model intended for domestic or light utility usage, or may be a large model, such as those that are suitable for use in large scale electricity generation on a wind farm for example. In the latter case, the diameter of the rotor could be as large as 120 metres or more.

FIG. 2 illustrates a schematic view of an example of an interior of the nacelle 3. A main drive shaft 7, supported by a main bearing 11 extends from the hub 6 and is received in a gear box 8. A secondary shaft 9 extends from the gear box 8 and into the generator 10. The nacelle 3 may also comprise a power converter, a transformer 12, as well as ancillary apparatus, such as control devices, sensors, heating and lighting units, hydraulic systems, cooling systems and so on.

In many modern wind turbines, the rotor blades 5 are equipped with sensors for monitoring rotor blade performance. Such sensors may detect strain, lightning, temperature, air turbulence, vibration, or noise to name a small number of examples. Many more types of sensor are in use.

Each sensor must receive control signals and power to operate, and be able to transmit data back to a central processor or reading device. This would be straight forward if the sensors were housed in the wind turbine nacelle 3, but is made challenging due to the sensor's location in the blade, which is a frame of reference that is rotating relative to the turbine and nacelle. Although, power sources and simple controllers can be located in the rotor hub, and rotate with the rotor blade, there is still a need to transfer data from the frame of reference of the rotating hub 6 to that of the nacelle 3.

A known method of transferring data from a rotating device to a non-rotating device is employed in the ARCNET system and is based on electro-magnetic induction in opposing circuit loops.

The ARCNET system comprises an opposing arrangement of circular rotating plates, one of which is mounted on the drive shaft, and one of which is mounted on a stationary member in the gear box housing. In ARCNET, each plate carries a single, circular circuit loop located coaxially around the central circular opening on one plate. A signalling system pulses a DC signal to generate flux in the two loops and to transmit information from one plate to the other. With ARCNET a data rate of between 2 Mb/s and 10 Mb/s is possible. In terms of the data that must be transmitted from the sensors on the blade, this capacity can be quickly exceeded.

The inventor has therefore appreciated that there is a need for an improved system and method of transmitting data between the hub and the nacelle.

SUMMARY OF THE INVENTION

According to a preferred embodiment of one aspect of the invention, a signalling device is provided for transmitting electrical signals between two wind turbine components that in operation undergo rotation relative to one another. The device comprises first and second members for coupling to respective first and second wind turbine components, the first and second members having at least intermittently opposing surfaces and undergoing relative rotation to one another, about an axis of rotation perpendicular to the opposing surfaces; one or more electrical paths mounted on each of the opposing surfaces in positions that, due to the relative rotation, at least partly correspond to each other during the rotation, wherein in operation the electrical paths are energised to create a flux that threads the paths on the first and second members; and wherein the axis of rotation is located outside of the electrical paths, such that the electrical paths of at least one member rotate orbitally around the axis of rotation.

As the electrical paths do not enclose the central axis of rotation, they can be made smaller, improving the flux density for a given current strength and also the efficiency with which the signal can be transmitted. Also, the flux that is created when a loop is energised by an electrical signal can then be threaded to a corresponding opposing loop without the central axis being an obstacle.

In one embodiment, the axis of rotation is displaced from the centre of at least one member, such that the opposing surfaces of the first and second members intermittently oppose one another as the rotation brings one member into positional correspondence with the other. This allows the signalling device to be used in different spatial settings within the wind turbine, as required.

In another embodiment, the axis of rotation is located at the centre of at least one of the members. This allows the weight of the rotating member to be balanced evenly around the axis, and reduces mechanical wear and tear on the mechanical components.

The paths may be closed by an electrical signal transmitter and/or an electrical signal receiver. Doing so, means that the electrical connections can be simplified, and the receiver and transmitters can be of a simplified design.

Preferably, the electrical signal transmitter applies an oscillating carrier signal to at least one of the electrical paths. This creates a persistent flux threading the closed paths of the opposing members and means that a signal can be carried via a suitable modulation scheme. In a preferred scheme, digital signals are represented by changing the sign or the phase of the oscillating signal.

In some embodiments, one of the wind turbine components is stationary, such as the gearbox, and the first member is mounted on the gearbox. This location is advantageous for receiving signals from the rotating blade hub, as the gearbox is typically first in the drive chain.

The other wind turbine component may then be the rotating shaft and the second member is mounted to rotate with the rotating shaft. In particular embodiments, the opposing surfaces of both the first and second members have a central hole for receiving the shaft about which they undergo relative rotation. The first and second members may further be rotationally symmetric about the rotating shaft, as this facilitates stable rotation of the rotating member stable, and means that the rotating and non-rotating members are interchangeable for maintenance and servicing.

In one embodiment, the closed electrical paths comprise a plurality of loops arranged at the same radial distance from the axis of rotation. Such loops are preferable for half duplex transmission schemes allowing bi-directional transmission of information. Additionally, the closed electrical paths may comprise a second plurality of loops arranged at a different radial distance from the axis of rotation. This provides transmitting and receiving loops for bi-directional transmission in a full duplex scheme.

In some embodiments, the electrical paths are loops having long and short sides, wherein the long sides are concentric circular sections and the short sides connect the concentric circular sections. Such loops are one example of a shape that maximises the flux that is threaded between the transmitting and receiving members.

In another aspect of the invention, a wind turbine is provided. In some embodiments, the wind turbine comprises a signalling device according to one or any combination of the preceding embodiments of a signalling device.

BRIEF DESCRIPTION OF THE DRAWINGS

Preferred embodiments of the invention will now be described in more detail, by way of example, and with reference to the drawings in which.

DETAILED DESCRIPTION OF THE PREFERRED EMBODIMENTS

An apparatus for transferring data between bodies undergoing rotation will now be discussed by way of example. The bodies in question may be wind turbine components such as a turbine drive shaft and a stationary part of the turbine, such as nacelle gearbox. A data or control signal can therefore be transmitted between a rotating member, such as a turbine blade, and equipment in the nacelle. The apparatus comprises two members that are placed adjacent and opposing one another, and on the opposing surface of which a number of closed electrical paths are provided. The closed electrical paths do not enclose the rotational axis, and therefore rotate orbitally with the members. At least one of the loops is energised with a carrier high frequency oscillating signal to create a flux that threads the loop on the opposing member. Modulation of the carrier frequency allows signals to be transmitted between the members.

Preferred examples of the invention will now be described in more detail, with reference to FIGS. 3 and 4.

Figure 1:
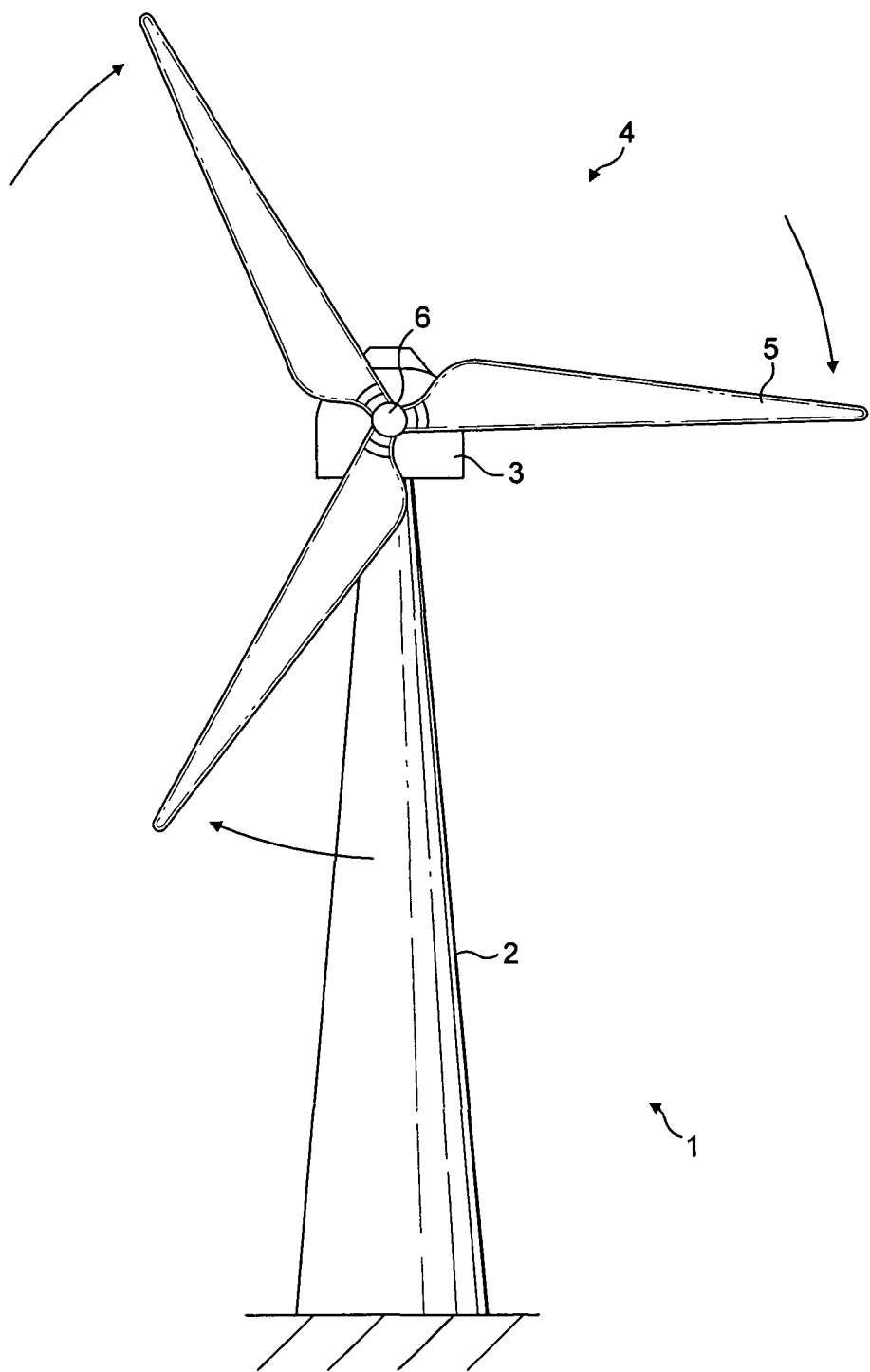
FIG. 1 is a schematic illustration of a wind turbine.
Figure 2:
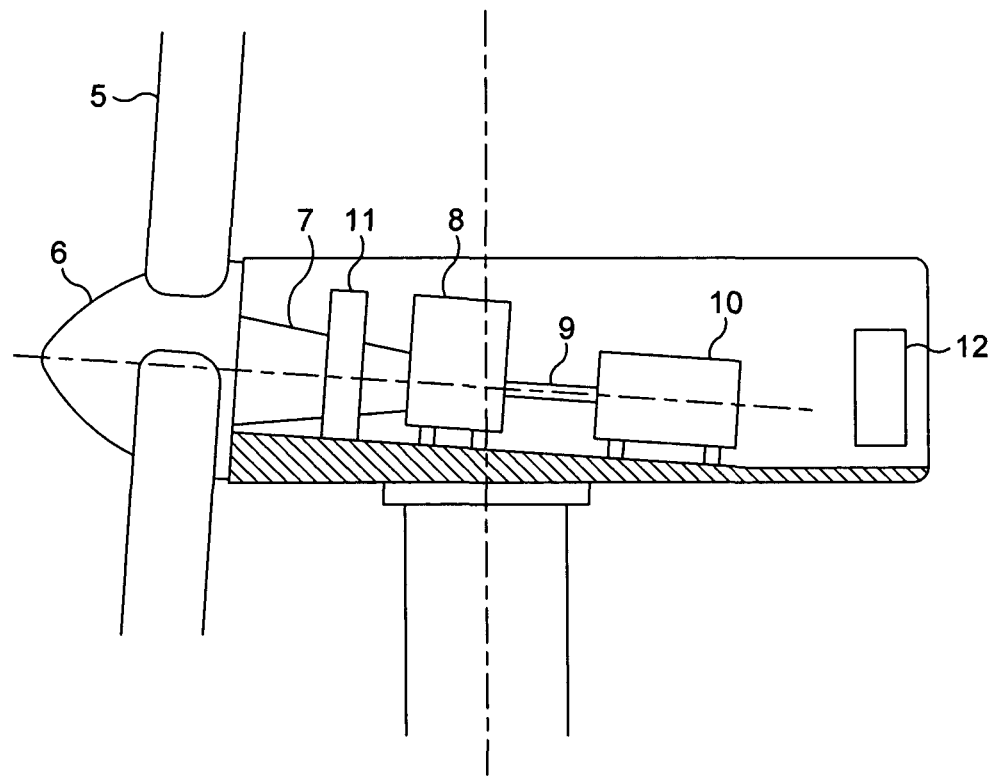
FIG. 2 illustrates the drive shaft and gear chain of a wind turbine in more detail.
Figure 3:
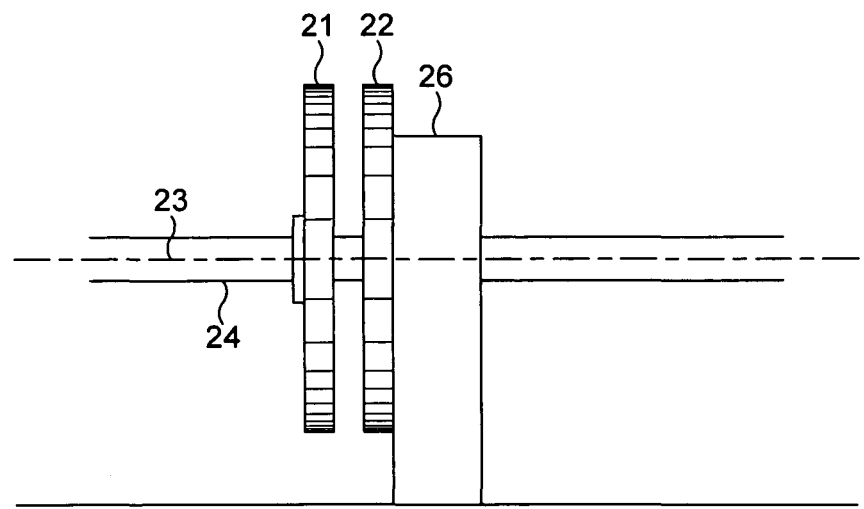
FIG. 3 is a side elevation view of a preferred example of the invention.

FIG. 3 is a side elevation view of a first preferred example, in which a first 21 and second 22 circular plate are placed in close proximity to one another, preferably only a few mm apart, one in front of the other and co-axially aligned with respect to an axis of rotation 23. FIG. 4 shows the opposing faces of the plates 21 and 22 viewed from their front. In FIG. 4, the individual electrical paths on each face have been labelled as A1, A2, A3, A4 and B1, B2, B3 and B4 respectively.

As shown in FIG. 3, the first plate is coupled to a rotating part or shaft 24, which may be the main shaft 7 of the turbine. The coupling is illustrated in FIG. 3 by a securing collar 25, although it will be appreciated that any suitable means for attaching the circular plate 21 to the rotating shaft 24 could be employed and would be apparent to the skilled person. Particularly, the shaft 7 and the circular plate 21 could for example be a single integrally formed piece.

The other plate 22 is attached to a stationary part of the machinery 26, such as the gearbox 8 housing, and has a central co-axial hole 27 for receiving the shaft, which therefore threads the plate 22. The attachment may by screws or other fasteners 28 as appropriate. The circular plate 21 therefore rotates with the shaft 24 as this is turned by other apparatus (not shown), such as, but not limited to the rotor hub 6. As the shaft turns, the first plate 21 is rotated with respect to the second stationary plate 22.

Both first 21 and second 22 circular plates bear one or more electrical circuits 29 on their surface, which as the plates rotate, are brought into and out of correspondence with opposing circuits on the other plates. The circular plates may comprise printed circuit boards (PCBs) in which the electrical circuits are fashioned, or alternatively the circuits may be manufactured and attached to the plates by any other suitable method, such as adhesive. Electrical wires or leads (not shown) connect the electrical circuits to other electrical devices such as data processors connected to sensor circuitry for example. For plate 21 the electrical leads may be attached along the length of the shaft 7 to rotate with the shaft, the hub and the rotor blades.

Figure 5:
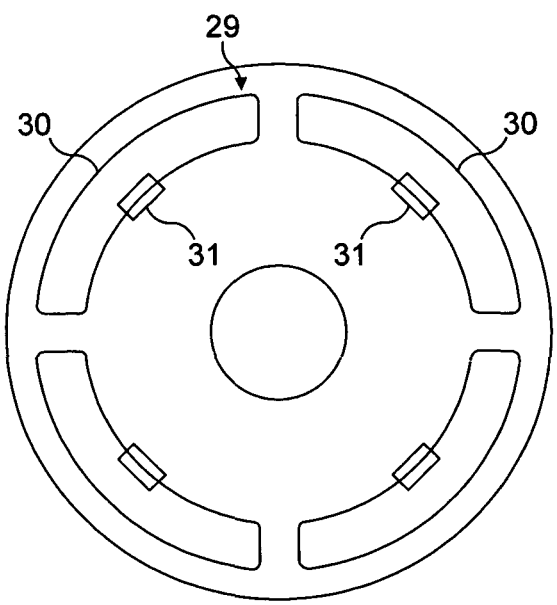
FIG. 5 illustrates the circuit arrangement on a transmitting and receiving plate in more detail.

FIG. 5, to which reference should now be made, shows in more detail the preferred arrangement of the electrical circuits 29 on each plate 21 and 22. The electrical circuit 29 preferably comprises one or more loops 30 of conductive material placed around the periphery of the circular plate. In the example shown, there are four discrete loops 30, each extending for a quarter of the circumference, and generally longer in the circumferential direction, than in the radial direction. Although the loops shown in FIG. 5 are essentially oblong, comprising two circumferentially extending paths that are concentric with respect to the edge of the circular plate and shorter, joining radial paths, other shapes and positions of loop may be possible in alternative embodiments. This is discussed in more detail below. In one embodiment (described below) the loop may include transmitters/receivers 31 inserted in the loop as part of the circuit, to either introduce the signal (transmitting side) or detect a voltage drop across the loop (receiving side).

In the preferred example, the patterns of loops on plates 21 and 22 are symmetrical, and the plates are arranged co-axially with each other so that the area enclosed by the loop 30 on one plate 21 is opposite to the corresponding loop on the other 22.

Operation of the transmission scheme will now be explained in more detail. In this example, it is assumed that a sensor signal is to be transmitted from the left most plate 21 in FIG. 3, to the right most plate 22. In order to transmit the sensor signal, the loops 30 on plate 21 are supplied with an alternating current. This creates a flux that threads both the actively energised loops 30 on the transmitting plate, and the loops on the opposite plate, energising them with a similar alternating current via electrical induction. The alternating current acts as a carrier signal, on which a sensor signal can be modulated.

In a preferred example, the phase of the high frequency alternating current is modulated to carry data bits. Specifically changes in the phase or sign of the modulating signal are used cause a change in the flux threading the loop on the receiver side of the system. This will cause a signal dependent change in the current flowing in the receiver loop 30, which can in turn be detected by suitable receiver circuitry and converted into a digital voltage level representative of the original signal. The gaps between the loops 30, which will rotate with the flux, will cause a slight, periodic fluctuation in the detected signal, which can easily be adjusted for.

A number of phase modulation signalling schemes are known, and will not be described in detail here. As the system cannot transfer DC, the used protocol must ensure that not too many '1' or '0' follows each other.

Transmission of a signal with the rotating plates 21 and 22 is bidirectional, either into or out of the nacelle, depending on which of the plates 21 or 22 the loops are actively energised with a current, and on which plate the loops are inductively energised by the flux. It is possible also to transmit according to a half duplex scheme in which the direction of transmission, and therefore the plate on which the loops are actively energised changes periodically. The period may be only a small number of rotations of the plates 21. If full duplex transmission in both directions is required, a second set of loops can be provided concentric to the first for transmitting in the opposite direction.

Figure 4:
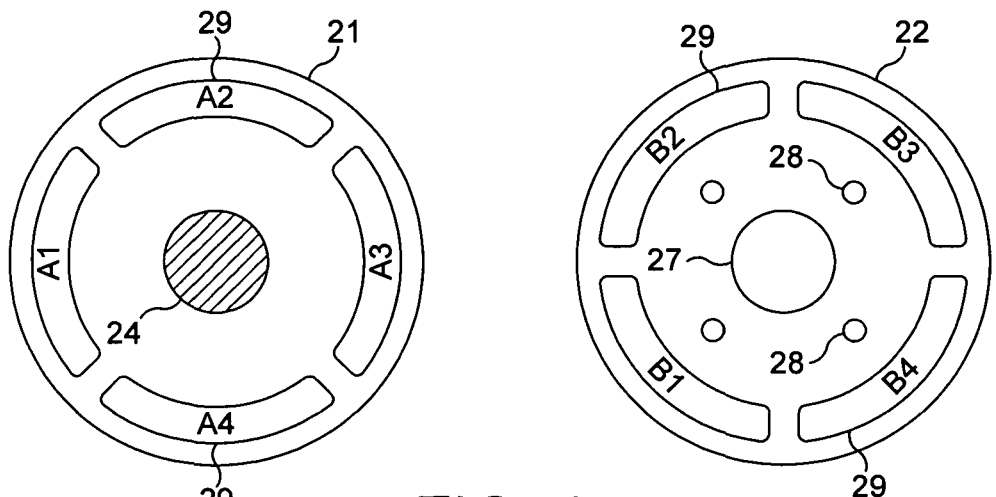
FIG. 4 illustrates a preferred arrangement of transmitting and receiving plates shown in FIG. 3.

In one embodiment, that may be understood with reference to FIG. 4 for example, two loops on the same plate may be used to carry different signals. In this example, loops A1 to A4 are considered to be transmitting, and loops B1 to B4 receiving. For example, if loops A1 and A3 are used to carry two different signals, then when the plates are face-to-face, the flux from the loop A1 would to different degrees be received by loops B1 and B2, and the flux from the loop A3 would be received by loops B3 and B4. As the plates 21 and 22 turn relative to one another, the signals from loops A1 and A3 would subsequently be received by the other loops.

By installing detectors in each loop B1, B2, B3 and B4 to detect which of the signals is received, and the strength of the signal received in comparison to the other loops, the receiver side could both distinguish between the two signals, and decide which of the loops gives the optimum signal strength.

Alternatively, the relative rotational positioning of the two loops may be determined using positional sensors, such as inductive or optical sensors that allow control logic at the receiver side to select the desired signal from those received.

Although, in this example loops A1 to A4 have been described as transmitting, and loops B1 to B4 as receiving the opposite arrangement is also possible, as are arrangements in which one loop on each plate transmits, while the other available loops receive.

In a simple embodiment transmitters/receivers 31 are physically inserted in the loop as part of the circuit, to either introduce the signal (transmitting side) or detect a voltage drop across the loop (receiving side). In practice, however, the receiver and transmitter circuits may also be located externally to the plates, and the appropriate signal carried via insulated wires to the circuits 29.

To strengthen the coupling between plates 21 and 22, a ferrite or similar material could in alternative examples be provided on the plate 21 and 22, inside each loop 30.

In the example above, the shape of the electrical paths illustrated is concentric with the edge of the circular plates. This is advantageous because by ensuring that the boundary of the loop follows the rotational movement, good correspondence between the path of one plate and the path of another is ensured, allowing optimal threading of flux between loops. However, other loop shapes are possible, such as circular loops where circumstances make this desirable. As noted above, a second set of circuit loops could also be provided on the plate for full duplex, bi-directional transmission.

Any number of electrical paths could be provided as desired. The four paths per rotation are preferred as they provide a full rotational period of coverage, without being too large. Larger loops suffer from a smaller flux density and this can lower the data transmission rate.

Further, in the preferred example described, the plates are circular and are arranged to rotate co-axially with one another. This is advantageous as it means that the weight of the plates is evenly distributed around the axis of rotation, and the rotation is more stable as a result. It also means that the surfaces of one plate continuously opposes the other plate, and that a number of different electrical circuits 29 can be accommodate in the full 360 period of rotation.

Other shapes or configurations of rotating plates are also possible. First, it is likely in practice that only one of the plates will actually be rotating while the other will be effectively stationary. In this case, providing the electrical circuit arrangement of the stationary plate corresponds in layout and size to that of the rotating plate, the shape of the stationary plate is immaterial.

Figure 6:
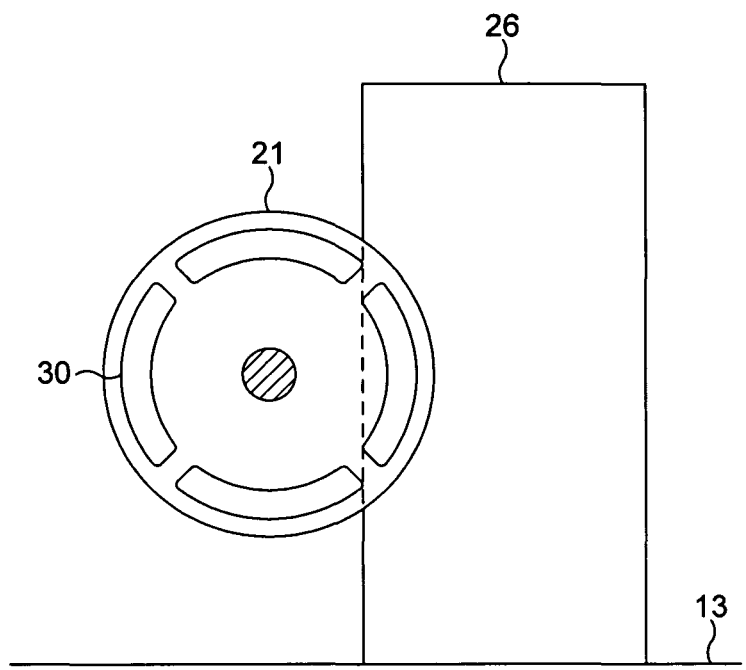
FIG. 6 is an end-on elevation view of an alternative example of the invention.
Figure 7:
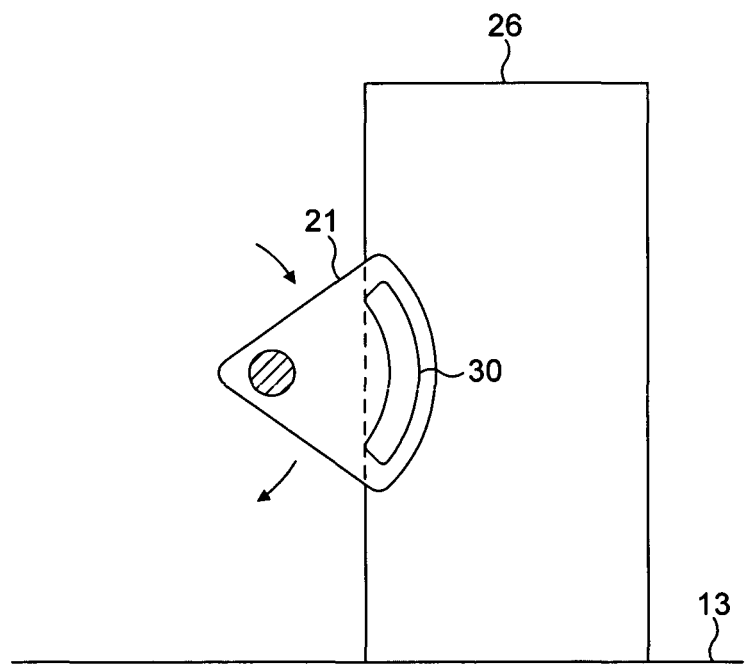
FIG. 7 is an end-on elevation view of a further alternative example of the invention.

Further, it is not absolutely necessary that the two plates be arranged co-axially with each other. Due to other constraints or requirements, it may for example be preferred to place the electrical circuits of one of the plates to one side of the axis of rotation, as shown in FIG. 6. It is also not necessary that the rotating plate be attached to the rotating wind turbine component at its centre. The plate could for example be elongate in shape, and mounted for rotation at one edge, end or corner, such as in FIG. 7. If the electrical circuits are then provided at the opposite end of the plate, they will be brought into inductive correspondence with the circuits of the other plate for only a short period of the rotation.

The proposed scheme has been found to give a significant improvement over existing schemes, and is capable of delivering data rates of beyond 100 Mb/sec. The improvement of the ARCNET scheme for example can be attributed the high frequency alternating current which results in the loops 30 being constantly energised. Further, the area enclosed by the loops 30 is smaller than if they had been located coaxially around and enclosing the axle or the hole provided for the axle. The flux can therefore be focussed more easily and can be made more responsive to changes. Further in the prior art ARCNET example the axle is in the flux field and therefore has a dampening effect, which is avoided if the loops are located towards the periphery of the plates.

In the above description, the two wind turbine components to which the plates 21 and 22 have been attached have been a gearbox and a rotating drive shaft. It will be appreciated however that the invention could be used at any location in the wind turbine where a signal is required to be transmitted between two rotating components. An example is the yaw drive where the tower nacelle 3, which may be is rotatable, is supported on the tower.

Other changes and modifications within the scope of the following claims will occur to the skilled person.

The invention claimed is:

1. A signaling device for transmitting electrical signals between two wind turbine components that in operation undergo rotation relative to one another, the signaling device comprising:
   first and second members for coupling to respective first and second wind turbine components, the first and second members having at least intermittently opposing surfaces and undergoing relative rotation to one another about an axis of rotation perpendicular to the opposing surfaces; and one or more respective electrical paths mounted on each of the opposing surfaces in positions that, due to the relative rotation of the first and second members, at least partly correspond to each other during the rotation, wherein in operation the electrical paths are energized to create a flux that threads the corresponding electrical paths of the first and second members;

wherein the axis of rotation is located outside of the one or more electrical paths, such that the electrical paths of at least one of the first and second members rotate orbitally around the axis of rotation.

2. The signaling device of claim 1, wherein the axis of rotation is displaced from the center of at least one of the first and second members, such that the opposing surfaces of the first and second members intermittently oppose one another as the rotation brings one member into positional correspondence with the other.

3. The signaling device of claim 1, wherein the axis of rotation is located at the center of at least one of the first and second members.

4. The signaling device of claim 1, wherein the one or more electrical paths include at least one of an electrical signal transmitter and an electrical signal receiver.

5. The signaling device of claim 4, wherein the electrical signal transmitter is configured to apply an oscillating carrier signal to at least one of the one or more electrical paths.

6. The signaling device of claim 5, wherein digital signals are represented by changing the sign or the phase of the oscillating carrier signal.

7. The signaling device of claim 1, wherein one of the first and second wind turbine components is stationary.

8. The signaling device of claim 7, wherein the one wind turbine component that is stationary is a gearbox and the first member is mounted on the gearbox.

9. The signaling device of claim 8, wherein the other wind turbine component is a rotating shaft and the second member is mounted to rotate with the rotating shaft.

10. The signaling device of claim 1, wherein one of the wind turbine components is a rotating shaft, and the opposing surfaces of both first and second members each define a respective central hole for receiving the rotating shaft about which the opposing surfaces undergo relative rotation.

11. The signaling device of claim 10, wherein the first and second members are rotationally symmetric about the rotating shaft.

12. The signaling device of claim 10, wherein the electrical paths comprise a plurality of loops arranged at a same radial distance from the axis of rotation.

13. The signaling device of claim 12, wherein the electrical paths comprise a second plurality of loops arranged at a different radial distance from the axis of rotation.

14. The signaling device of claim 1, wherein the electrical paths are loops having long and short sides, wherein the long sides are concentric circular sections and the short sides connect the concentric circular sections.

15. A wind turbine, comprising:
a wind turbine tower; and
a signaling device disposed on the wind turbine tower and configured to transmit electrical signals between two wind turbine components that in operation undergo rotation relative to one another, the signaling device comprising:
    first and second members for coupling to respective first and second wind turbine components, the first and second members having at least intermittently opposing surfaces and undergoing relative rotation to one another about an axis of rotation perpendicular to the opposing surfaces; and
    one or more respective electrical paths mounted on each of the opposing surfaces in positions that, due to the relative rotation of the first and second members, at least partly correspond to each other during the rotation, wherein in operation the electrical paths are energized to create a flux that threads the corresponding electrical paths of the first and second members;
wherein the axis of rotation is located outside of the one or more electrical paths, such that the electrical paths of at least one of the first and second members rotate orbitally around the axis of rotation.

16. A wind turbine, comprising:
a tower;
a nacelle disposed on the tower; and
a signaling device disposed on the tower, the signaling device comprising:
    a first member disposed on a first axis;
    a first plurality of electrical paths disposed on the first member, each path being at a location removed from the first axis;
    a second member disposed on a second axis, the first and second members being rotatably disposed relative to each other in respective planes that are parallel to each other; and
    a second plurality of electrical paths disposed on the second member, each path being at a location removed from the second axis, wherein, during relative rotation of the first and second members:
        the first plurality and second plurality of electrical paths are rotated relative to each other; and
        energizing at least one electrical path of one of the first plurality and second plurality of electrical paths creates a flux that induces a current in at least one electrical path of the other one of the first plurality and second plurality of electrical paths, whereby the signaling device is configured for transmitting electrical signals between two wind turbine components that in operation undergo rotation relative to one another.

17. The wind turbine of claim 16, wherein the first axis and the second axis are the same.

18. The wind turbine of claim 16, wherein one wind turbine component is a gearbox and the first member is mounted on the gearbox.

19. The wind turbine of claim 18, wherein the other wind turbine component is a rotating shaft and the second member is mounted to rotate with the rotating shaft.

20. The wind turbine of claim 19, wherein the first and second members each define a respective central hole for receiving the rotating shaft.

* * * * *